United States Patent [19]

Moeller

[11] Patent Number: 5,289,509
[45] Date of Patent: Feb. 22, 1994

[54] SHIELDED COMB-LINE ANTENNA STRUCTURE FOR LAUNCHING PLASMA WAVES

[75] Inventor: Charles P. Moeller, Del Mar, Calif.

[73] Assignee: General Atomics, San Diego, Calif.

[21] Appl. No.: 5,598

[22] Filed: Jan. 19, 1993

[51] Int. Cl.$^5$ .............................. G21B 1/00
[52] U.S. Cl. ................................ 376/123
[58] Field of Search ............ 376/123, 124, 131, 132; 219/10.55 R, 10.57

[56] References Cited

U.S. PATENT DOCUMENTS

| | | | |
|---|---|---|---|
| 4,661,304 | 4/1987 | Perkins, Jr. et al. | 376/123 |
| 4,710,339 | 12/1987 | Ohkawa | 376/123 |
| 4,755,345 | 7/1988 | Baity, Jr. et al. | 376/123 |

OTHER PUBLICATIONS

Chiu, et al., "Study of the Slow-Wave Structure as an ICRF Launcher", *Nuclear Fusion*, vol. 24, (6), pp. 717–723 (1984).

Matthaei, "Comb-Line Band-Pass Filters of Narrow or Moderate Bandwidth", *Microwave Journal*, pp. 82–91 (Aug. 1963).

Moeller, et al., "A Comb Line Structure for Launching Unidirectional Fast Waves", in Radiofrequency Heating and Current Drive of Fusion Devices. *Europhysics Conference Abstracts*, vol. 16E, Brussels, 7–10 Jul. 1992, Editors: C. Gormezano, et al.

*Primary Examiner*—Daniel D. Wasil
*Attorney, Agent, or Firm*—Fitch, Even, Tabin & Flannery

[57] ABSTRACT

A comb-line antenna structure (80) includes a multiplicity of parallel current straps (86) through which an appropriate rf electrical current passes in order to launch a desired magnetosonic wave (42) into an adjacent plasma mass (39). The current straps are mounted within a conductive, shallow, open box (88, 90) that faces the plasma mass. The current straps are inductively coupled, thereby requiring only a single rf input port (82) at one end of the comb-line structure. The rf input port provides a substantially constant impedance to an rf power source. A single rf output port (84) at the other end of the comb-line structure allows for the recirculation of the rf power. A multiplicity of U-shaped wickets (92) loop over and enclose each current strap. Such wickets function as a Faraday shield to shield the plasma and adjacent current straps from electrostatic fields. The comb-line antenna structure finds primarily applicability in providing plasma heating and/or current drive in a tokamak, or equivalent plasma-forming structures.

18 Claims, 4 Drawing Sheets

SHIELDED COMB-LINE ANTENNA STRUCTURE FOR LAUNCHING PLASMA WAVES

BACKGROUND OF THE INVENTION

The present invention relates to an improved comb-line antenna structure that may be used to launch magnetosonic waves into a plasma for plasma heating or current drive in a plasma device, e.g., a tokamak. More particularly, the invention relates to an improved comb-line antenna structure suitable for use in a tokamak that, in one embodiment, eliminates the need for discrete loading capacitors at the end of each current strap used in the comb-line antenna, and provides Faraday shielding between the antenna and plasma in a way compatible with a traveling wave.

Tokamaks are devices that are used in connection with the study and generation of thermonuclear fusion energy. Fusion is the energy source of the sun and other stars. While science has not yet advanced sufficiently far to allow fusion to be used as a practical energy source, scientists and engineers, working at laboratories around the world, are making great strides relative to fusion research and to the engineering development of fusion for electrical power and other applications. Advantageously, fusion fuel is in abundant supply, and the generation of fusion energy provides a safe and clean energy source.

In generating fusion energy, the atoms of two or more fuels, typically deuterium ($^2$H) and tritium ($^3$H), heavy hydrogen isotopes, are exposed to extremely high temperatures. Such high temperatures separate the positively charged nuclei of the hydrogen isotopes from their normally tightly bound negatively charged electrons, forming a plasma. (A plasma is a hot ionized gas.) When this separation occurs, the neutrons and protons of the nuclei recombine to form a heavier element, such as $^4$He, and a neutron or other small nuclear particle. Energy from this reaction is released as kinetic energy of the fast moving reaction products, and it can be converted to heat. The heat thus created provides the high temperature needed to sustain the fusion reaction, and portions thereof can be extracted and used as a useful energy source, e.g., to generate electricity.

The conditions for the fusion reaction are very difficult to achieve. For example, in order to kindle a deuterium-tritium fusion fire, the temperature of the fuel must be heated to over 50,000,000° C. Moreover, to sustain the fusion fire, i.e., to keep the fusion reaction going, it is necessary to confine the normally chaotic mass of fast moving, superheated nuclei (the plasma) long enough for the fuel to react and produce energy beyond that necessary to sustain the temperature. To produce enough fusion reactions to make the process worthwhile, the heat losses from the fuel must be low enough so that the fuel can sustain a temperature of around 150,000,000° C. Once such a self-sustaining reaction is achieved, it is possible to use the heat thus produced to generate electricity, or for other purposes.

Achieving such high temperatures requires supplying energy to the fuel and raising its temperature to a level where the internal fusion reactions can provide further heating. Various techniques are currently used to accomplish such heating, e.g., heating with an internal electric current, heating by various waves, and/or heating by the injection of energetic neutralized hydrogen atoms ("neutral beam injection"). The present invention relates to a particular type of antenna structure, referred to as a "comb-line antenna" structure, that may be used to launch a particular type of fast electromagnetic wave, referred to as a "magnetosonic wave", into the forming plasma for plasma heating and current drive.

Unlike the sun and stars, where the massive plasma ball is confined by gravity, fusion reactors require some type of container for holding the 150,000,000° C. plasma fireball in a way that prevents it from touching the container walls. (Plasma, which has a density approximately 100,000 times lower than atmospheric pressure, is a mere puff of gas that would quickly cool if it touched the container walls.)

Fortunately, because plasma is an ionized gas, it can be confined with a magnetic field. That is, the otherwise random motion of the charged particles that are found within plasma may be converted to an orderly form of motion that follows the magnetic field lines of an applied magnetic field. Thus, various types of "magnetic bottles" have been developed in the art to create the appropriate magnetic field lines to confine the plasma to a desired volume.

One of the most highly developed magnetic bottles is a toroidal bottle known as the "tokamak". Tokamaks were first developed during the 1960s in the then-existing USSR, and have subsequently been adopted as the leading magnetic confinement device. A tokamak includes both external toroidal-field coils and poloidal-field coils that generate magnetic fields, as well as means for generating a toroidal electrical current that flows through the plasma itself. The magnetic fields created by such toroidal- and poloidal-field coil currents, as well as by the plasma electric current, all combine to confine the plasma to a general toroidal shape that encircles a major axis of the tokamak. The poloidal-field coils are also used to magnetically shape the general cross section of the plasma. Tokamaks are well documented in the literature. See, e.g., Artsimovich, L. A., *Nuclear Fusion*, Vol. 12, pp. 215 et seq. (1972); and Furth, H. P., *Nuclear Fusion*, Vol. 15, pp. 487 et seq. (1975).

The fast magnetosonic wave is a preferred wave for noninductive current drive in tokamaks containing high temperature plasmas. See, Fisch et al., *Phys. Fluids*, Vol. 24, p. 27 (1981). Note, the term "magnetosonic" wave is used herein and in the art to describe a "fast wave" or a compressional "Alfen wave." The launching structure used to launch such a magnetosonic wave into the plasma has typically consisted of several (typically four) poloidal straps that are individually fed through external matching networks and phase shifters to an appropriate power source (a high power rf generator). Disadvantageously, such a launching configuration does not present a matched load to the generator when the plasma position and edge density vary. Further, the mutual coupling between the current straps causes unbalanced loading of the straps. Such unbalanced loading greatly complicates the phasing and matching of the structure to the generator. Hence, what is needed is a launching structure for use in a tokamak (or similar plasma-confining device) that presents a matched load to the generator even though the plasma position and edge density of the plasma may vary, and wherein any mutual coupling between the current straps may be used to an advantage rather than a disadvantage.

A "comb-line" structure is a structure that includes an array of antenna loops, or equivalent current straps, where only one of such loops or straps is driven with an input signal, while the others are coupled through mutual inductance. Comb-line structures have long been used as band-pass filters having a narrow or moderate bandwidth. See, e.g., Matthaei, George L., "Comb-line Band-Pass Filters of Narrow or Moderate Bandwidth:, *Microwave Journal*, pp. 82-91 (August 1963).

A few years ago, the comb-line structure was identified as a possible launching structure for launching the ion cyclotron range of frequencies (ICRF) into the plasma of a fusion tokamak for plasma heating and current drive. See, Chiu et al., "Study of the Slow-Wave Structure as an ICRF Launcher", *Nuclear Fusion*, Vol. 24, No. 6, p. 717-723 (1984). The comb-line structure is a good candidate for current drive because it can easily be made to produce a traveling wave spectrum, and the principle of its operation requires that it be only weakly coupled to the plasma. Weak coupling is plausible for reactor applications because it allows the structure to be recessed from the plasma.

Despite the potential benefits to be derived from using a comb-line structure to launch magnetosonic waves into a plasma, the comb-line structure has not heretofore been used for such application. Such non-use can be attributed, in large part, to practical considerations associated with the dimensions of the various elements of the comb-line structure. For example, discrete capacitors have heretofore been used with each current strap in order to allow each current strap, which must function as a resonant circuit, to be of a manageable length. The physical size of such capacitors, while having a capacitance value of only tens of picofarads for most frequencies, must nonetheless be quite large so that the capacitors can hold off the extremely high voltages in the plasma environment. Such large physical size restricts the spacing of the current straps. Hence, what is needed is either a physically smaller capacitor that can hold off the extremely high voltages in the plasma environment, or a comb-line antenna structure that eliminates the need for discrete capacitors.

An additional problem associated with using a comb-line structure as a launching structure with a plasma device, such as a tokamak, is that of providing shielding of the plasma from the electrostatic fields emanating from the current straps. An electrostatic field is ever present around the current carrying straps of a comb-line structure. Such electrostatic field must be confined to the region near the current straps in order to avoid its penetration into the plasma, which penetration can cause an influx of impurities into the plasma. The appropriate magnetic fields associated with the current straps, on the other hand, need to encircle the adjoining straps so that the desired mutual coupling between the straps can occur, and so that the requisite magnetosonic wave can be launched into the plasma. Thus, there is a need when using a comb-line structure as a magnetosonic launcher for establishing an effective electrostatic shield between the current straps and the plasma that blocks electrostatic fields, yet passes traveling magnetic fields.

SUMMARY OF THE INVENTION

The present invention advantageously addresses the above and other needs by utilizing a comb-line structure that includes a multiplicity of parallel current straps through which an appropriate rf electrical current passes in order to launch a desired magnetosonic wave into an adjacent plasma mass. The current straps are mounted within a conductive, shallow, open box that faces the plasma mass. The current straps are inductively coupled, thereby requiring only a single rf input port at one end of the comb-line structure. Advantageously, the single rf input port, in combination with the inductive coupling between the current straps, provides a substantially constant impedance to an rf power source if the structure is sufficiently long or properly terminated. A single rf output port at the other end of the comb-line structure allows for the recirculation of the rf power, if needed. A multiplicity of U-shaped wickets loop over and enclose each current strap. The wickets advantageously eliminate capacitive coupling between the straps, yet allow inductive coupling to occur. The elimination of capacitive coupling between the straps eliminates the need for the discrete capacitors. Such wickets further function as a Faraday shield to shield the plasma from electrostatic fields, yet readily allow magnetic fields to pass into the plasma.

In accordance with one aspect of the invention, the comb-line antenna structure is mounted on the inside of the outer wall of a tokamak so as to front the plasma. The magnetosonic waves are launched into the plasma so as to propagate in the direction of a minor axis of the tokamak, and such magnetosonic waves thus provide plasma heating and/or current drive in the tokamak. Advantageously, the single rf input port allows a good impedance match to be made with a high power rf generator, which impedance match is maintained despite variations in the plasma position and edge density. Further, the rf output port allows any rf power remaining at the output port to be recirculated back to the input port, thereby enhancing the efficiency of the launching structure.

In accordance with another aspect of the invention, the Faraday shield is mechanically configured to be somewhat flexible, (i.e., not absolutely rigid). Thus, the wicket structure is able to flex, as needed, to accommodate thermal stresses that develop as the structure is used in close proximity to a high temperature plasma.

The present invention may thus be broadly described as a comb-line antenna structure useful for launching fast magnetosonic waves in tokamaks, or equivalent "magnetic bottle" structures, containing high temperature plasma. The comb-line antenna structure includes a plurality of parallel current straps, with each current strap being enclosed within a multiplicity of wickets. Each of the wickets are grounded to a conductive ground plane, which conductive ground plane is a prescribed stand-off distance from the plurality of parallel current straps. Input power means apply rf input power to a first one of the plurality of parallel current straps. Each of the current straps is spaced a specified distance apart from an adjacent current strap so that some of the rf input power applied to the power input means is inductively coupled from one current strap to an adjacent current strap, with each of the current straps receiving some rf power. When positioned adjacent a conductive medium, such as a plasma, some of the rf power present at each current strap is launched from the respective current strap to produce a traveling magnetosonic wave within the conductive medium.

It is thus a feature of the invention to provide a comb-line launching structure for use in a tokamak (or similar plasma-confining device) that efficiently launches a magnetosonic wave into a plasma mass from a location adjacent the plasma mass.

It is another feature of the invention to provide such a comb-line launching structure, utilizing a plurality of parallel, inductively coupled current straps, wherein the mutual coupling between the current straps is used to an advantage rather than a disadvantage; and more particularly wherein such mutual coupling allows the launching structure to present a matched load to an rf input generator, even though the plasma position relative to the current straps, and the density of the plasma at its edge, may vary.

It is a further feature of the invention, in accordance with one embodiment thereof, to provide a comb-line antenna structure that eliminates the need to use discrete capacitors with each of the current straps.

It is still another feature of the invention to provide an effective Faraday shield for use with a comb-line launching structure in a tokamak, or other plasma-forming device, that shields the plasma from electrostatic fields, yet readily passes magnetic fields.

It is yet an additional feature of the invention to provide a magnetosonic wave launching device for use with a tokamak, or other high operating temperature device, that is sufficiently bendable and pliable and able to react to thermal stresses without breakage or excessive movement towards the plasma.

BRIEF DESCRIPTION OF THE DRAWINGS

The above and other aspects, features and advantages of the present invention will be more apparent from the following more particular description thereof, presented in conjunction with the following drawings and appendix wherein.

Figure 3A:
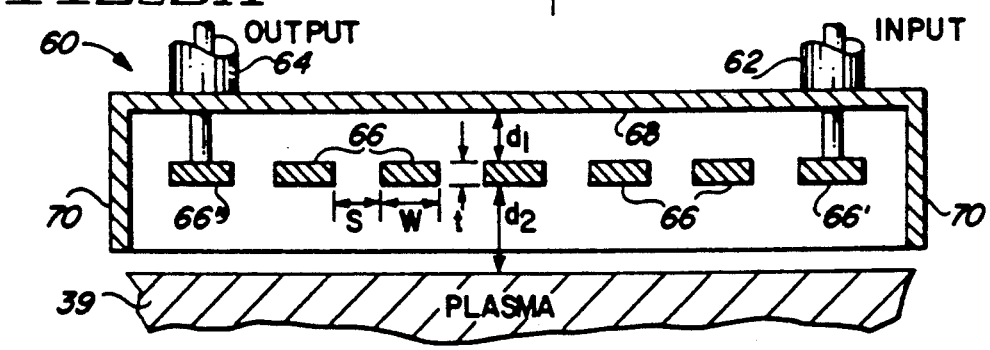
FIGS. 3A and 3B depict top and side views, respectively, of one embodiment of a comb-line antenna structure that may be used to launch magnetosonic waves into a plasma.
Figure 3B:
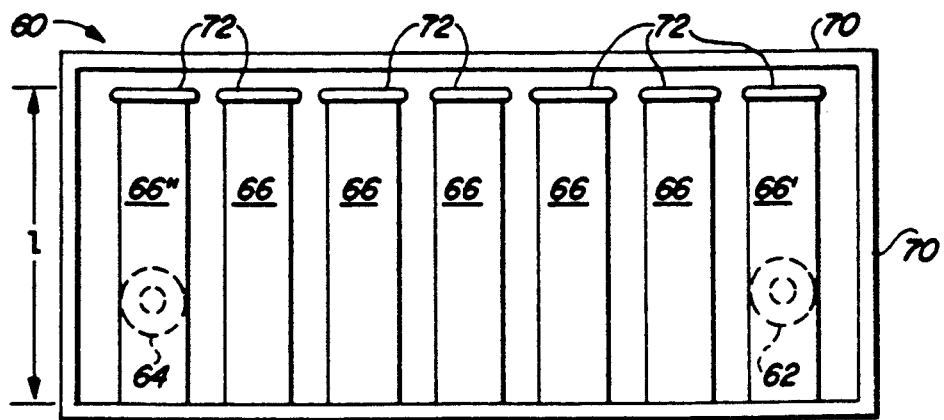
Figure 4A:
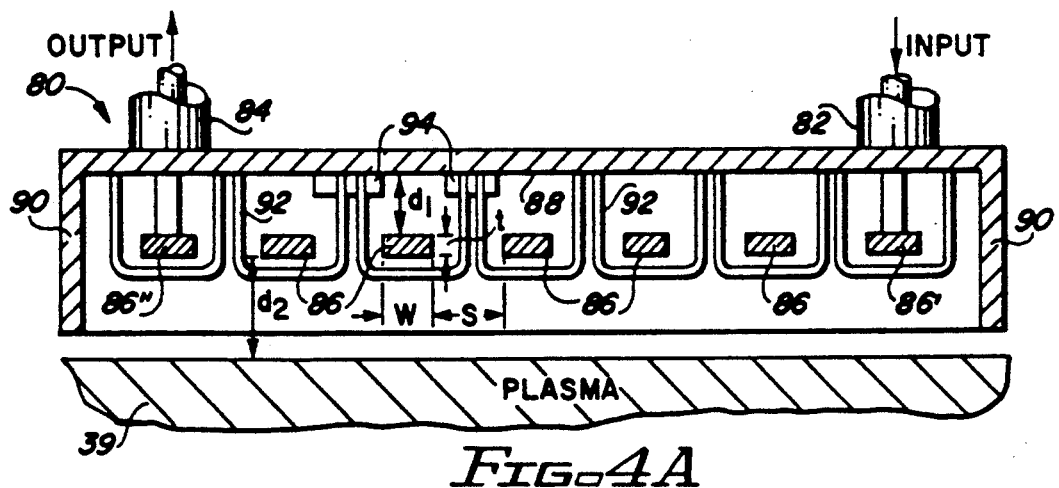
FIGS. 4A and 4B depict top and side views, respectively, of a preferred embodiment of a shielded comb-line antenna structure made in accordance with the present invention.
Figure 4B:
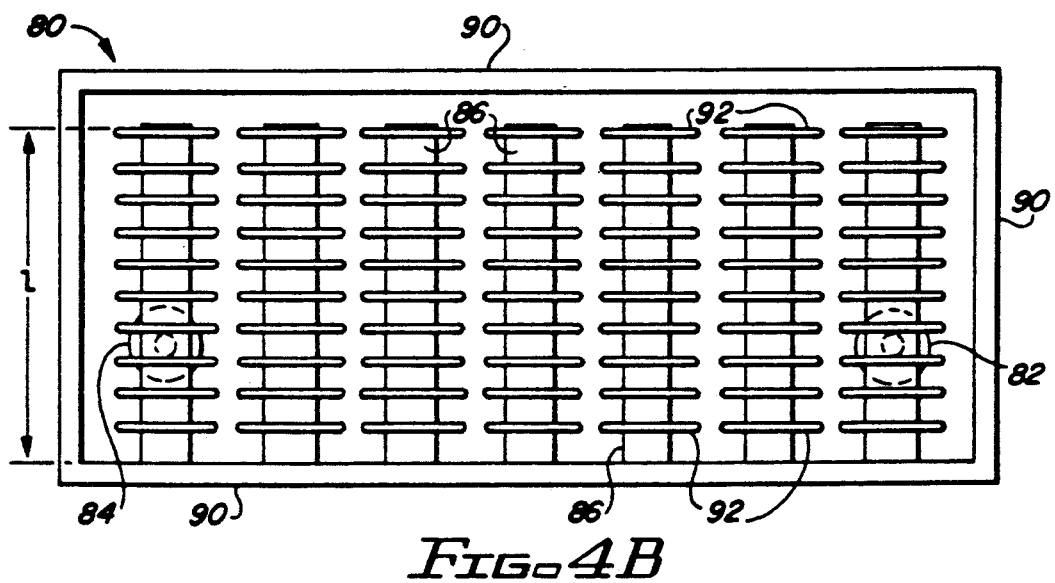

Appendix A provides a mathematical analysis of the comb-line dispersion with and without a plasma for the embodiment of the invention shown in FIGS. 3A & 3B, which analysis is readily adaptable by those of skill in the art to the embodiment of the invention shown in FIGS. 4A and 4B.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

In order to better understand the primary application of the present invention, i.e., a launcher of magnetosonic waves into a plasma-forming device, it will first be helpful to provide an brief description of a tokamak --the preferred plasma-forming device with which the invention is used. Hence, reference is made to FIG. 1 where there is shown a diagrammatic view of the main elements of a tokamak 20, with a portion thereof cutaway. The design and operation of such a tokamak is well described in the art, see, e.g., Artsimovich and/or Furth, supra, so only a very cursory overview of the tokamak's construction is presented herein.

Figure 1:
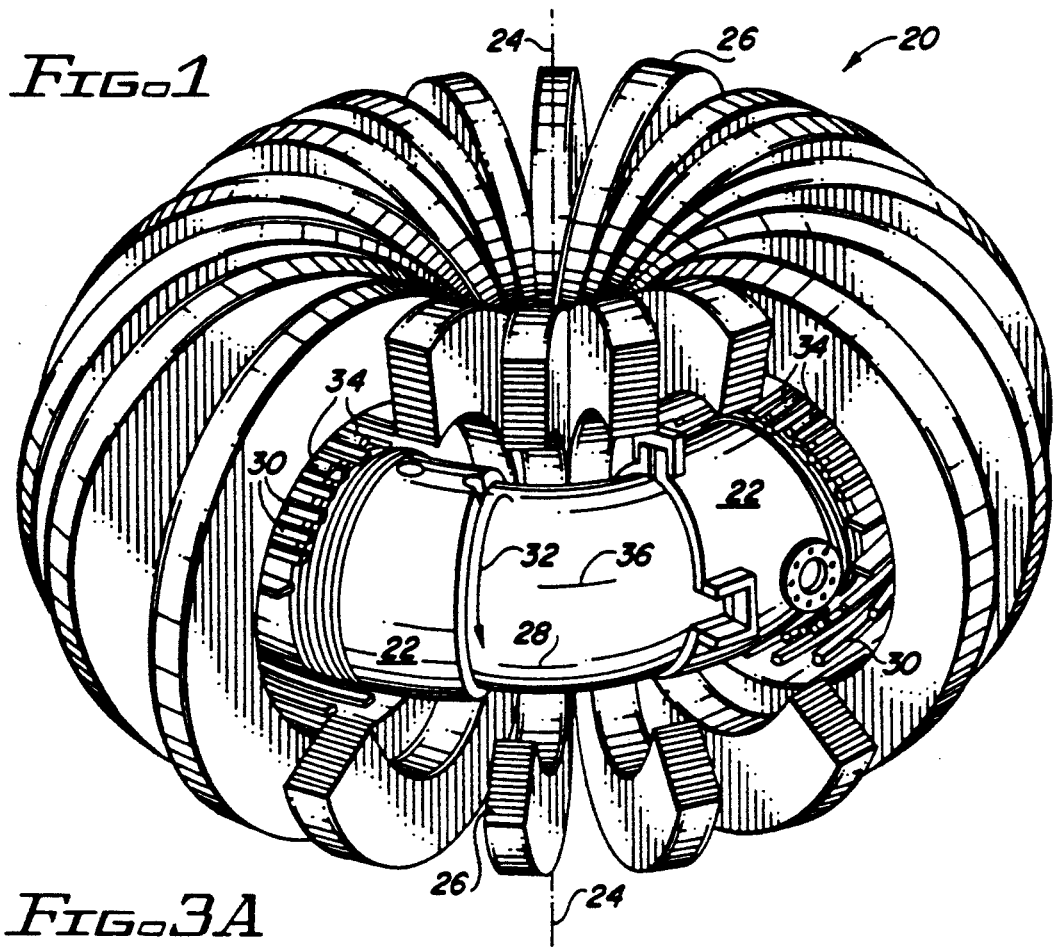
FIG. 1 shows a perspective view of a generic tokamak, with a portion thereof cutaway.
Figure 1A:
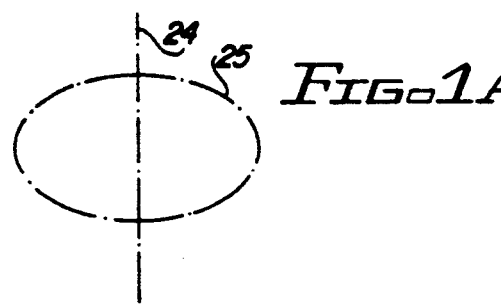
FIG. 1A defines the major and minor axes associated with a tokamak.

Basically, the tokamak 20 includes a toroidal vacuum vessel 22 that is centered about a major axis 24. A minor axis 25, centrally located within the toroidal vessel 22, encircles the major axis 24. The relationship of the major and minor axes 24 and 25 is shown in FIG. 1A.

The vessel 22 is made from a conductive material, such as non-magnetic stainless steel or inconel, and is constructed with sufficiently thick walls to withstand the vacuum pressures that are developed therein. A large number of toroidal field magnetic coils 26 are equally spaced around the vessel 22, each encircling the minor axis 25 and a respective segment of the vessel 22. Eighteen such coils 26 are illustrated in FIG. 1, but this number is only exemplary. When energized with an electrical current, the toroidal coils 26 combine to produce a toroidal magnetic field $B_T$, represented by the arrow 28, that encircles the major axis 24 within the vacuum vessel 22.

A plurality of poloidal field magnetic coils 30 are positioned inside of the toroidal field coils 26, yet still outside of the vacuum vessel 22, so as to encircle the major axis 24. As depicted in FIG. 1, the windings of the poloidal field coils 30 are substantially perpendicular to the windings of the toroidal field coils 26. When energized with an appropriate electrical current, the poloidal field magnetic coils 30 combine to produce a poloidal magnetic field $B_P$, represented by the arrow 32, that encircles the minor axis 25 of the vacuum vessel 22.

Because plasma is an ionized gas, it is also an electrical conductor, with the movement of electrons (negatively charged particles) in one direction and the movement of positively charged ions in the other direction representing the flow of electrical current. An important part of the operation of a tokamak is the creation of axial current flow through the plasma contained within the vessel 22. Such current flow serves to heat the plasma, and is frequently referred to as the "current drive" of the tokamak. The current drive follows the minor axis 25 of the tokamak and is depicted in FIG. 1 by the arrow 36. The current drive may be initiated and maintained by launching a suitable plasma wave into the vacuum vessel 22 that propagates in the direction of the minor axis. The comb-line antenna structure described hereinafter provides one means for launching such a wave. In addition, ohmic heating primary windings 34 may be positioned inside of the toroidal field coils 26, in close contact with the vacuum vessel 22, so as to encircle the primary axis 24, much like the poloidal field coils 30. When energized with an electrical current, the field coils 30 (acting as a transformer primary winding) induce an electrical current, $I_P$, in the plasma (acting as a transformer secondary winding), which electrical current $I_P$ also contributes to the current drive of the tokamak.

Not shown in FIG. 1, but understood to be part of any tokamak or similar plasma-confining structure are conventional means for establishing a desired vacuum pressure within the vessel 22, and means for injecting the appropriate gases into the vessel from which plasma may be formed.

In operation, appropriate gases are introduced into the vacuum vessel 22 at the appropriate pressure. These gases, e.g., $^2H$ and $^3H$, are heated to extremely high temperatures in order to form a hot plasma. The toroidal magnetic field $B_T$ confines the plasma to a toroidal volume inside of the vessel 22 that does not touch the walls of the vessel. This occurs because the toroidal magnetic field $B_T$ has lines of magnetic force coincident or parallel with the minor axis 25, and plasma, as a whole, is substantially confined to and follows magnetic lines of force, forming as it were a plasma ring.

The poloidal magnetic field $B_P$ is needed to complete the plasma confinement against drifts caused by gradients in $B_P$. The combined fields form, as it were, a plasma and magnetic vortex. The externally applied component of $B_P$ is also used to shape the cross sectional area of the plasma ring within the toroidal plasma volume to a desired shape. For example, at some points within the vessel, or at some times when the plasma is within the vessel, the cross sectional area of the plasma cloud may be "squeezed", thereby compressing the plasma into a smaller volume, and further increasing its temperature. At other points within the vessel, or at other times, the cross sectional shape of the plasma cloud may be expanded, with some of the plasma particles being diverted away from the main plasma body. Such control of the cross-sectional shape of the plasma cloud is, as indicated, controlled by the poloidal field coils 30. For this reason, such coils are sometimes referred to as the "shaping field coils" or "shaping field windings".

Figure 2:
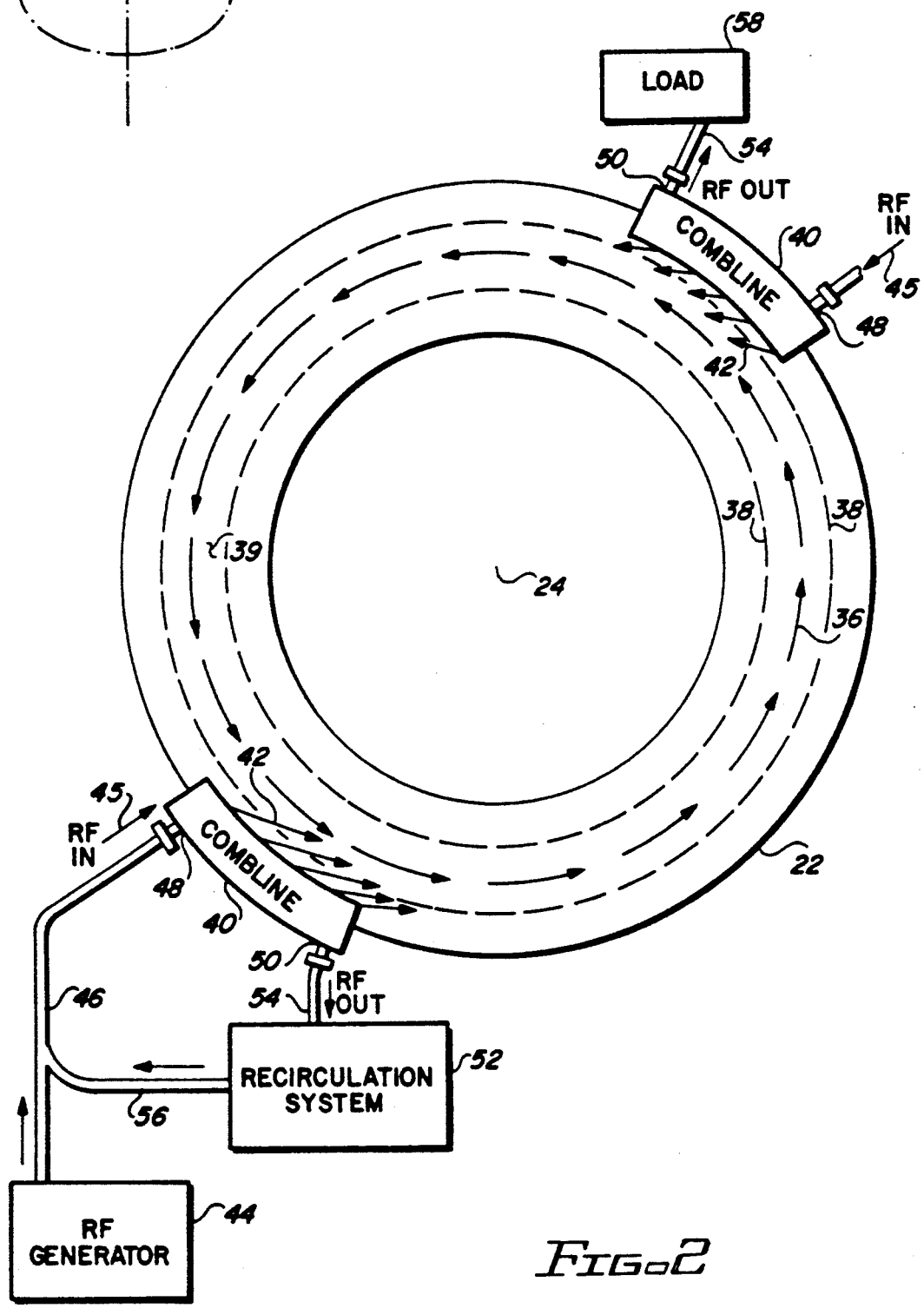
FIG. 2 diagrammatically illustrates the toroidal chamber of a tokamak where plasma is formed, and further diagrammatically illustrates the comb-line antenna structure of the present invention used to launch unidirectional magnetosonic waves into the plasma.

Referring next to FIG. 2, the manner in which a comb-line antenna structure 40 made in accordance with the present invention may be used to launch unidirectional plasma waves into the plasma of a tokamak is diagrammatically illustrated. The toroidal vacuum vessel 22 of a tokamak is depicted in FIG. 2 from a view along the major axis 24. Once formed, the plasma is confined within the vessel 22 so as not to touch the walls of the vessel 22, i.e., to reside within the area bounded by the dotted lines 38, thereby forming a plasma ring 39. One or more comb-line antenna structures 40, described more fully below, are mounted to the inside of an outer wall of the vessel 22 so as to front or face the toroidal plasma ring 39. Two such structures 40 are shown in FIG. 2, but such is only exemplary. Typically, the comb-line structures 40 will be recessed within the outer wall of the vessel 22. However, as will be evident from the description that follows, the comb-line structures are sufficiently shallow to enable their mounting on the inside of the outer wall of the vessel 22 without being recessed and still not encroach on the area to which the plasma ring 39 is confined.

Still referring to FIG. 2, an rf generator 44 generates rf input power, represented by the arrow 45, that is applied to an input port 48 of the comb-line structure 40 through a conventional waveguide 46. As described more fully below, the rf input power 45 is directly coupled to a first current strap within the comb-line structure 40, and inductively coupled to other current straps within the comb-line structure by means of a traveling wave propagating along the structure. In the vacuum region immediately surrounding the comb-line structure, the electromagnetic field of this traveling wave is evanescent in the radially inward direction. Such wave traveling along the comb-line is diagrammatically illustrated in FIG. 2 by the arrows 42. If the distance to the plasma 39 is small, such an evanescent field couples to a magnetosonic wave suitable for providing current drive and heating in the plasma mass, while the power flow along the comb-line structure is damped by the power transfer to the plasma.

The comb-line structure 40 also includes an rf output port 50. Any of the rf input power 45 that is coupled to a last current strap within the comb-line structure 40 without being converted to the traveling wave 42, or without otherwise being dissipated within the comb-line structure 40, is received at the output port 50. This rf output power may either be applied through a conventional waveguide 54 (or other suitable transmission line) to a load 58, or to a recirculation system 52. If applied to a recirculation system, the recovered rf power is combined with the input power generated from the rf generator 44 in order to reapply it to the input port 48, thereby improving the efficiency of the comb-line structure 40. A representative recirculation system 52 is described below in conjunction with the description of FIG. 5.

Referring next to FIGS. 3A and 3B, one embodiment of a comb-line antenna structure 60 is shown. FIG. 3A shows a "top" view, similar to the view orientation of FIG. 2, and FIG. 3B shows a "side" view, showing the comb-line structure as viewed from the plasma. As with the generic comb-line structure 40 of FIG. 2, the comb-line structure 60 includes a single input port 62 and a single output port 64. The structure 60 resembles, electrically as well as mechanically, a comb-line bandpass filter. The structure 60 includes a plurality of parallel current straps 66 that are supported in a plane above a conductive surface 68. Each strap 66 has an approximate length l, width W, and thickness t. As best seen in FIG. 3B, discrete capacitors 72 are placed at one end of each of the straps 66. What is shown as item 72 in FIG. 3B is one plate of the capacitor, with the conductive wall 70 functioning as the other plate.

Each current strap 66 is separated a distance S from an adjacent strap. The plane formed by the straps 66 thus has the approximate dimensions of l by N(W+S), where N is the number of current straps that are used. The plane of the straps 66 is separated from the conductive surface 68 by a standoff distance $d_1$. Such plane is spaced adjacent to the plasma mass 39 a distance $d_2$. In operation, the edge of the plasma mass 39, as well as the density of the plasma at its edge, will vary. Thus, it is understood that the distance $d_2$ will also vary. While the plane of the straps 66 is depicted in FIG. 3A as being straight, it is also to be understood that there will typically be some curvature associated with such plane as it fits against or within the outer wall of the toroidal vacuum vessel 22 (FIG. 2).

Still referring to FIGS. 3A and 3B, side walls 70 are attached to the conductive surface 68, thereby forming a housing or "box", within which the straps 66 are supported. The straps 66 may be mechanically supported from one section of such wall 70. A first conductive strap 66', on one edge of the plane formed by the straps 66, is electrically connected to the rf input port 62. A last conductive strap 66", on an opposing edge of the current strap plane, is electrically connected to the rf output port 64.

In operation, the comb-line structure 60 is inherently a traveling wave device, in the sense that power applied to its input port 62 launches a wave traveling toward the output port 64, with power being inductively coupled between adjacent straps. The structure 60 shown in FIGS. 3A and 3B, as well as the preferred structure shown below in FIGS. 4A and 4B, offers the significant advantage that far fewer feedthroughs and tuning elements are required to launch the same total power than are used in prior art devices that individually drive each current strap. Such feedthroughs (input and output ports) and tuning elements are costly and occupy valuable space near the tokamak. Of course, approximately the same current per strap is required to launch a given power per strap regardless of whether the straps are fed directly or inductively. However, the power per feedthrough can be much higher for the comb-line structure shown in FIGS. 3A and 3B (as well as in FIGS. 4A and 4B) because the input port 62 sees a matched load. That is, with individually fed straps, the standing wave ratio at each feedthrough is necessarily high because the resistive component of the strap impedance is typically only a few ohms. In contrast, the input impedance of the comb-line structure 60 reflects the accumulated loading of all the straps. The resonant elements are internal to the comb-line structure 60, so the standing wave ratio is low at the feedthrough (input port 62).

The concept of using a comb-line structure to launch fast waves into a plasma is described in Chiu, et al., *Nuclear Fusion*, Vol. 24, p. 717 (1984), cited previously. An analysis of a more practical form of the comb-line structure 60 is provided in Moeller et al., "A Comb Line Structure For Launching Unidirectional Fast Waves", Europhysics Conference Abstracts on *Radiofrequency Heating and Current Drive of Fusion Devices*, Vol. 16E, pp 53-56, Brussels (Jul. 7-10, 1992). These two references—the Chiu et al. and Moeller et al. references—are incorporated herein by reference.

A preferred comb-line structure 80, made in accordance with the present invention, is depicted in FIGS. 4A and 4B. Such structure 80 resembles the structure 60 described in connection with FIGS. 3A and 3B above except for two major differences: (1) there are no discrete capacitors used with the structure 80; and (2) the structure 80 includes a multiplicity of wickets (or hoops) 92 that enclose each current strap. FIG. 4A shows a "top" view, similar to the view orientation of FIG. 2, and FIG. 4B shows a "side" view, showing the comb-line structure 80 as viewed from the plasma 39. As with the generic comb-line structure 40 of FIG. 2, the comb-line structure 80 includes a single input port 82 and a single output port 84. The structure 80 includes a plurality of parallel current straps 86 that are supported in a plane above a conductive surface 88. Each strap 86 has an approximate length l, width W, and thickness t. Each current strap 86 is separated a distance S from an adjacent strap. The plane formed by the straps 86 thus has the approximate dimensions of l by $N(W+S)$, where N is the number of current straps that are used. The plane of the straps 86 is separated from the conductive surface 88 by a standoff distance $d_1$. Such plane is further spaced adjacent to the plasma mass 39 a distance $d_2$. In operation, the edge of the plasma mass 39, as well as the density of the plasma at its edge, will vary. Thus, it is understood that the distance $d_2$ will also vary. Like the description above in connection with FIGS. 3A and 3B, it is noted that while the plane of the straps 86 is depicted in FIG. 4A as being straight, it is to be understood that there will typically be some curvature associated with such plane as it fits against or within the outer wall of the toroidal vacuum vessel 22 (FIG. 2).

Still referring to FIGS. 4A and 4B, side walls 90 are attached to the conductive surface 88, thereby forming a housing or "box", within which the straps 86 are supported. The straps 86 may be mechanically supported from one section of such wall 90. A first conductive strap 86', near one edge of the plane formed by the straps 86, is electrically connected to the rf input port 82. A last conductive strap 86", on an opposing edge of the current strap plane, is electrically connected to the rf output port 84.

A multiplicity of current wickets 92 (or conductive hoops) enclose each of the current straps 86. These wickets are oriented so as to lie substantially orthogonal to the current straps. Such wickets are grounded to the conductive surface 88. In some instances, it may be desirable to mechanically support the wickets 92 to standoff bars 94 (only a couple of which are shown in FIG. 4A) that are attached to, or form an integral part of, the conductive surface 88. Such standoff bars 94 not only facilitate the mechanical connection of the wickets to the surface 88 (which surface 88 may be referred to as a conductive "backplane"), but also help to stiffen the backplane in the region where the attachment of the wickets is made.

The wickets 92 are made from a suitable conductive wire, such as inconel, molybdenum, titanium, or other high temperature conductor. Such wire is formed in the general shape of a hoop, and mounted to the backplane 88 so as to loop around or enclose the current strap, as best seen in FIG. 4A. It is important that the wicket 92 be kept close to the current strap 86, but not touch the current strap 86. Keeping the wicket close to the current strap increases the capacitance between the strap and shield, which is advantageous because it reduces the required length of the strap. In general, the separation distance between a given wicket 92 and the respective current strap that it encloses may be on the order of 0.5 to 1.0 cm with the U-shaped conductive wire being more or less equally spaced from the three sides of the current strap about which it loops. At an input frequency in the range of 100 to 200 MHz, the number N of current straps within the comb-line structure should be at least 10, with the length l of each strap being approximately 15 to 30 cm, the separation distance S between adjacent current straps being approximately 2.5 to 5.0 cm, and the width W of the current straps also being about 2.5 to 5.0 cm.

In lieu of wickets 92, some applications of the invention may utilize a row of posts that separate the current straps, which posts may be substantially the same as the legs of the wickets. Such posts would extend up from the backplane 88 just past the current straps, and would provide electrostatic shielding between the straps. In most instances, only a single row of posts would be required between current straps, although a double row could be used to increase the capacitance, if needed.

Figure 4C:
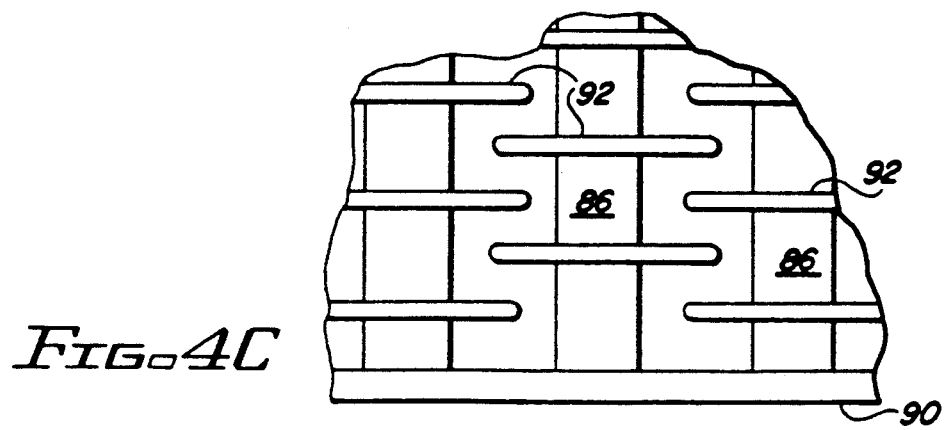
FIG. 4C shows a partial view of a comb-line antenna structure as in FIG. 4B, using an overlaping arrangement of wickets.

Further, it is noted that while each current strap 86 will generally have the same number of wickets enclosing it as do the other current straps, the wickets may be arranged in alternate rows so as to overlap, as shown in FIG. 4C, which shows a partial view of the antenna from the same vantage point as FIG. 4B.

An advantage achieved by the comb-line structure 80 shown in FIGS. 4A and 4B over the structure 60 shown in FIGS. 3A and 3B is the avoidance of discrete capacitors. At a typical operating frequency of 120 MHz, such discrete capacitors, when used, need only have a capacitance value of from 16 to 20 pf. However the peak voltage seen by such capacitors is on the order of tens of kilovolts. Given the type of hostile environment associated with plasma, this means that a spacing of at least 1 cm is needed between the plates of the capacitor in order to avoid breakdown if solid dielectrics are not used. Solid dielectrics do not survive well in or near a plasma environment. A spacing of 1 cm, in turn, translates to approximately a 200 cm² area that is required to order to achieve the necessary capacitance. Such area is not readily available. Hence, being able to avoid the use of discrete capacitors, as is accomplished with the comb-line antenna structure 80 shown in FIGS. 4A and 4B, offers an important advantage.

Another advantage achieved by the comb-line structure 80 (FIGS. 4A and 4B) over the structure 60 (FIGS. 3A and 3B) is the electrostatic shielding provided by the wickets 92. There is no such shielding provided by the structure 60. That is, the wickets 92 (FIGS. 4A and 4B) function as a Faraday shield, shielding the plasma 39 from the electrostatic fields that are present at the current straps. The desired plasma wave is excited inductively by the currents flowing in the current straps 86, and is referred to as a "magnetosonic" wave. Unfortunately, an electrostatic field is also produced by such straps that can excite undesired plasma waves. Such undesired waves not only represent wasted power, but also lead to acceleration of ions near the walls of the vessel 22 (FIG. 2). Advantageously, the Faraday shield provided by the wickets allows the divergence free, inductive field to readily pass therethrough, thereby allowing the desired inductive coupling between adjacent current bars to take place, but also blocks the curl free, electrostatic field. That is, because the wickets are electrically grounded, the electric field lines associated with such electrostatic fields terminate at the wickets, thereby confining the electrostatic fields to the immediate region surrounding the wickets. However, the wickets 92, by virtue of being more or less orthogonal to the direction of current flow in the current straps, allow the magnetic fields associated with the current flow in the current straps to readily pass therethrough. The passage of the magnetic fields through the wickets provides for the desired inductive coupling between adjacent current straps, as well as permits the appropriate plasma wave to be launched in the desired direction within the plasma 39.

The magnetosonic wave is launched from the current straps into the plasma through an evanescent layer, which concept is well understood by those of skill in the art.

An advantage of the comb-line structures 60 or 80 is that the axial wave number of the traveling wave in the structure, usually referred to as $n_{||}$, can be made to vary by adjusting the input frequency within the passband of the structure.

Figure 5:
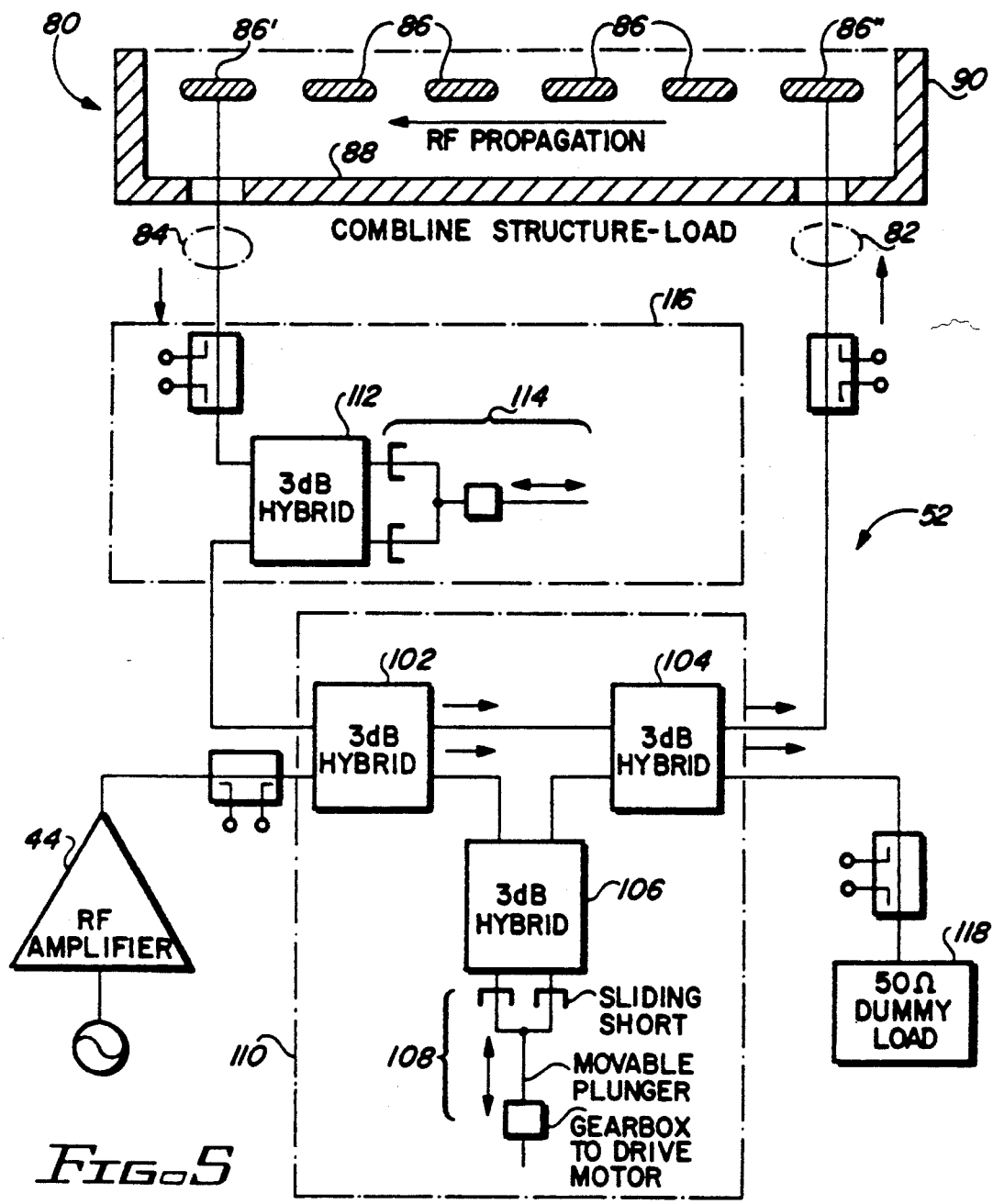
FIG. 5 is a schematic diagram of a recirculation system that may be used to maintain a traveling wave in a comb-line structure.

Referring next to FIG. 5, there is shown a schematic diagram of a recirculation system 52 that may be used to maintain a traveling wave in a comb-line structure, such as the comb-line structure 80 of FIGS. 4A and 4B. Such recirculation system 52 is used whenever it is not convenient, especially in existing tokamaks, to use a comb-line structure of sufficient length (i.e., having a sufficient number of current straps, N) to give complete damping under the conditions of poorest coupling. In such instances, a unidirectional wave is maintained by making the comb-line structure 80 part of a ring resonator, as shown schematically in FIG. 5.

As seen in FIG. 5, a group of three 3 dB couplers, 102, 104 and 106, in combination with a conventional stub tuner pair 108, form a variable directional coupler 110. An additional 3 dB hybrid coupler 112 and stub tuner 114 form an adjustable phase shifter 116. The phase shifter 116 is the only critical tuning element, in the sense that the resonance condition only requires an integral number of wavelengths around the ring. If the variable coupler 110 is not optimally adjusted, some fraction of the input power, generated by the rf amplifier 44, will go to a dummy load 118, but the ring will remain unidirectional and the generator 44 will not see a reflection, as long as the ring remains resonant.

The phase shifter 116 need not have rapid adjustment capability. Rather, any rapid fluctuations in the electrical length of the antenna structure 80 due to plasma movement may be compensated for by small adjustments in the frequency. Also, for reasonable loading of the antenna structure, the circulating power and hence the Q of the ring are low. Specifically, if T is the fraction of power incident at the antenna structure 80 that arrives at the output port 84, and C is the power coupling factor of the adjustable coupler 110, the ratio G of circulating power to generator power is $G = C/[1-(1-C)^{\frac{1}{2}}T^{\frac{1}{2}}]^2$, which is maximized when $C = 1-T$ and $G = 1/(1-T)$ and all the power is damped in the antenna. For example, if $T = 1/e$, then $G = 1.58$, which represents a very low Q. This means that resonance is not critical under such conditions.

To demonstrate the advantage of using the Faraday shield formed using the wickets 92, the electrical behavior of the comb-line structure 80 with and without an ideal Faraday shield will be compared. An ideal Faraday shield is considered as a shield that is transparent to magnetic fields, but appears as a perfect conductor to curl fee electric fields. For purposes of the comparison, it is assumed that the number of current straps is infinite, so that there are no end effects. Also, to simplify the comparison, the plasma is assumed to be a conducting wall. Using this simplified approach, it is also possible to calculate the plasma loading that determines the actual plasma impedance presented to the antenna structure as a perturbation. Such calculation is carried out in Appendix A for the discrete capacitor embodiment (FIGS. 3A and 3B). It is noted that such calculation is not related to the shielded verses non-shielded comparison presented below.

Figure 6:
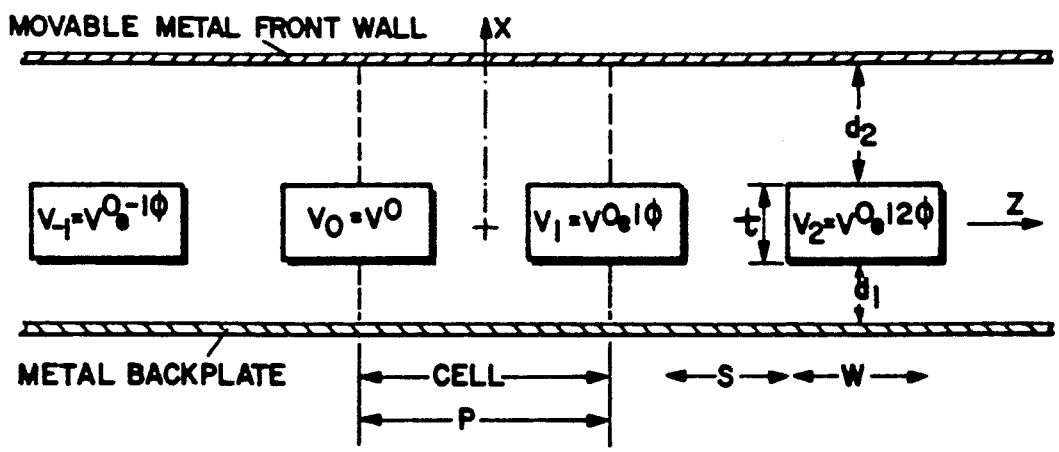
FIG. 6 illustrates the geometry used in connection with the mathematical comparison of the operation of the comb-line antenna structure of FIGS. 3A and 3B with that of FIGS. 4A and 4B, which figure is repeated in Appendix A as FIG. 2A.

The coordinate system used for the comparison that follows is shown in FIG. 6. Note, in FIG. 6 the Y coordinate is out of the paper.

Considering first the unshielded case, and designating $I_r(y)$ and $V_r(y)$ as the current and voltage, respectively, along the $r^{th}$ strap, the array of straps can be regarded as a multi-conductor TEM mode transmission line. Such transmission line is governed by the equations:

$$\frac{\partial V_r}{\partial y} = -i\omega \sum_{s=-\infty}^{\infty} L_{rs} I_s \quad (4a)$$

and $$\frac{\partial I_r}{\partial y} = -i\omega \sum_{s=-\infty}^{\infty} C_{rs} V_s \quad (4b)$$

where $C_{rs}$ is the mutual capacitance per unit length between the r and s strap, with the other straps (other than the $r^{th}$ strap) grounded, and $L_{rs}$ is the mutual inductance per unit length. (Note that Eqs. (1)−(3) are in Appendix A). If it is assumed that all of the straps are identical, and that there are no end effects, then it is only necessary to consider a typical element, r=0, and determine $L_{0S}$ and $C_{0S}$.

The currents and voltages in the straps may be expressed as:

$$I_r = I^0 \cos(\beta y) e^{-ir\theta} \quad (5a)$$

and $$V_r = V^0 \sin(\beta y) e^{ir\theta} \quad (5b)$$

The dependence of the current and voltage on y is a consequence of the TEM nature of the mode, and the assumption that the straps are all shorted to ground at y=0. The dependence on $e^{-ir\theta}$ comes from Floquest's theorem. In this case, $\beta = \omega/c$, where $\omega$ is the angular frequency, and c is the speed of light. The propagation constant along the structure, $k_z$, is just $k_z = \theta/P$, where P is the period.

Using Eqs. (5a) and (5b) in (4b), it is seen that, looking at the typical r=0 strap, $$\frac{V_0}{I_0} = ic \sum_{s=-\infty}^{\infty} L_{0s} e^{-is\theta} \equiv icL(\theta). \quad (6a)$$

Although $L(\theta)$ is defined as a fourier series having mutual inductances as coefficients, it is noted that $L(\theta)$ simply represents the self inductance per unit length of a strap when the phase shift from strap to strap is $\theta$. Combining Eqs. (2a) and (2b), it is also seen that $$\frac{I_r}{V_r}\bigg|_{y=l} = \frac{I^0}{V^0} \cot(\beta l) \quad (6b)$$

where l is the length of the straps. If there is an admittance $Y_0$ at the end of each strap, then $$\frac{I_r}{V_r}\bigg|_{y=l} = Y_0 = \frac{I^0}{V^0} \cot(\beta l) \quad (7)$$

Combining Eqs. (3a) and (4), a dispersion relation is obtained as $$\beta \tan(\beta l) = \frac{1}{c^2 L(\theta) C_e}, \quad (8)$$

where it is assumed that $Y_0 = i\omega C_e$, where $C_e$ is the discrete capacitance at the end of each strap, if any. Since $\omega/c = \beta$, and $k_z = \theta/P$, a relationship between $\omega$ and $k_z$ is thus obtained. The phase velocity along the structure is just $\omega/k_z$, while the group velocity, related to the energy flow, becomes $d\omega/dk_z$. As the end capacitance, $C_e$, approaches zero, however, $\beta \tan(\beta l)$ approaches $\infty$, which means than $\beta l$ approaches $\pi/2$. Thus, $\beta$, and therefore $\omega$, are then fixed, independent of $\theta$, and hence independent of $k_z$. The group velocity then approaches 0, so that there is no energy flow, and the antenna structure is cut off.

In contrast, when a Faraday shield is used, the equations for the shielded multi-conductor transmission line are:

$$\frac{\partial V_r}{\partial y} = -i\omega \sum_{s=-\infty}^{\infty} L_{rs} I_s \quad (9a)$$

and $$\frac{\partial I_r}{\partial y} = -i\omega C_0 V_r. \quad (9b)$$

For an ideal Faraday shield, $L_{rS}$ and $L(\theta)$ are unchanged from the above unshielded case. $C_0$ is the capacitance per unit length between a given strap and its shield. From Eqs. (9a), (5a) and (5b), it is seen that Eq. (8a) is again obtained. However, using Eqs. (9b), (5a) and (5b) it is seen that $$\beta^2 = \omega^2 L(\theta) C_0. \quad (10)$$

Eq. (10) thus shows that $\beta$ is no longer equal to $\omega/c$. Equivalently, Eq. (7) demonstrates that the velocity of light along the strap, for the shielded case, becomes $$c = \frac{1}{\sqrt{L(\theta) C_0}} \quad (11)$$

and is dependent upon $\theta$. The consequence of this is that even if $C_e = 0$, by making $\beta l = \pi/2$, the antenna structure is no longer cut off. In fact, when the quantity $\beta = \pi/2l$ is substituted into Eq. (10), it is seen that $$\omega = \frac{\pi}{2} \frac{1}{\sqrt{L(\theta) C_0}} \quad (12)$$

Since $C_0$ in the shielded case is always greater than $C(\theta)$ in the unshielded case, $\beta$ will always be greater than $\omega/c$, and the larger $C_0$ becomes, the greater will be $\beta$. The advantage of having a large $C_0$ and large $\beta$ is that the strap length, $l = \pi/2\beta$, can be shorter, which is normally desirable.

In general, if $C_e \neq 0$, Eqs. (8) and (10) show that the dispersion relation $$\omega \sqrt{L(\theta) C_0} \tan[l\omega \sqrt{L(\theta) C_0}] = \frac{C_0}{C_e} \quad (13)$$

takes the form $$U \tan U = lC_0/C_e \quad (14)$$

where $U = l\omega[L(\theta) C_0]^{\frac{1}{2}}$. This means that $$\omega \sqrt{L(\theta) C_0} = F(l, C_0/C_e)/l \quad (15)$$

where F is some complicated function of l and $C_0/C_e$, which reduces to $\pi/2$ when $C_e \to 0$.

The form of the dispersion relation remains unchanged from the case where $C_e = 0$, except for a scaling factor. That is, the ratio of the upper to lower cut off frequency, the "pass band ratio", $$\frac{\omega_{upper}}{\omega_{lower}} = \sqrt{\frac{L(0)}{L(\pi)}} \qquad (16)$$

is independent of l, $C_0$ and $C_e$, as is the functional dependance of $\omega$ on $\theta$, except for a scaling factor in the latter case. Adding $C_e$ allows l to be smaller, but does not effect the pass band ratio.

As described above, it is thus seen that the present invention provides a comb-line antenna structure that launches magnetosonic waves into an adjacent plasma mass. This it does, in the preferred embodiment (shown in FIGS. 4A and 4B) without the need for a discrete capacitor at the end of each current strap. In other embodiments (FIGS. 3A and 3B or variations thereof), it may be desirable to add a small end capacitance.

Moreover, as also seen from the above, the described comb-line structure effectively shields the plasma and adjacent current straps from electrostatic fields, yet still retains the requisite inductive coupling needed for the operation of a comb-line device.

As further seen from the above, the comb-line launching structure described further provides significant mechanical advantages over prior art launching devices in that the wickets used to enclose each current strap are flexible, yet strong, and are thus able to react to thermal stress, without significant distortion or breakage.

While the invention herein disclosed has been described by means of specific embodiments and applications thereof, numerous modifications and variations could be made thereto by those skilled in the art without departing from the scope of the invention set forth in the claims.

APPENDIX A

ANALYSIS OF COMBLINE DISPERSION WITHOUT PLASMA

- $n_z$ is first calculated with the plasma replaced by a perfectly conducting wall. The effect of the plasma surface impedance $\rho_p$ is then determined from a Taylor series expansion in $\rho$ of $n_z$.

- The structure may be regarded as a multi-conductor TEM mode transmission line, governed by the equations:

$$\frac{\partial V_r}{\partial y} = -i\omega \sum_s L_{rs} I_s , \qquad [1(a)]$$

$$\frac{\partial I_r}{\partial y} = -i\omega \sum_s C_{rs} V_s , \qquad [1(b)]$$

where $V_r$, $I_r$ are the voltage and current on the $r^{th}$ conductor, and $L_{rs}$ and $C_{rs}$ are the mutual inductance and capacitance between the $r^{th}$ and $s^{th}$ conductor.

- Let $V_r = V^\circ \sin\beta y\, e^{-ir\theta}$
  $I_r = I^\circ \cos\beta y\, e^{-ir\theta}$ where $\beta = \omega/c$, $c$ the velocity of light, and $\theta$ is the phase shift from element to element.

- Then, $$\frac{V^\circ}{I^\circ} = -ic \sum_s L_{os}\, e^{-is\theta} = -ic\, L(\theta) \quad , \quad [2(a)]$$

$$\frac{I^\circ}{V^\circ} = ic \sum_s C_{os}\, e^{-is\theta} = +ic\, C(\theta) \quad , \quad [2(b)]$$

where the $r = 0$ element is assumed typical.

- Therefore, $C(\theta)\, L(\theta) = 1/c^2$, so the dispersion can be determined from either a calculation of the capacitance or the inductance.

- $C(\theta)$ is the capacitance of a bar in a unit cell (Fig. 2) of length $p$ with periodic boundary conditions where the potential $\Phi(x, z)$ satisfies $\Phi(x, z+p) = \Phi(x, z)e^{i\theta}$

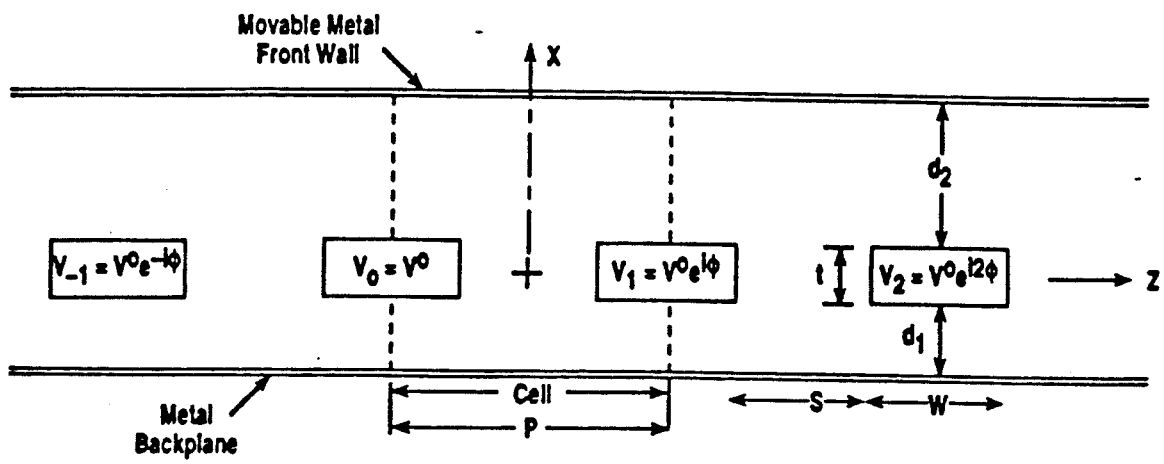

Fig. 2A *Geometry used in the calculation of $n_x$. The front wall is replaced by the plasma as a perturbation.*

- If each element is loaded at $y = \ell$ with admittance $Y_o$, $$\left.\frac{I_r}{V_r}\right|_{y=\ell} = \frac{I^o}{V^o} \cot(\beta\ell) = Y_o \quad , \text{ or}$$

$$icC(\theta) = Y_o \tan(\beta\ell) \quad .$$

- If $Y_o = i\omega C_e$, a purely capacitive loading, the dispersion is given by:

$$\beta C_e \tan(\beta\ell) = C(\theta) \quad . \tag{3}$$

- We have solved for $C(\theta)$ numerically using a variational technique. The results agree with published data from a conformal mapping solution for parameters for which they should both be valid.

- Taking the discrete fourier transform of Eq. [2(b)] with a finite number of terms, we find $C_{0s}$ decreases rapidly with $s$, so that $C_{00}$, $C_{01}$, and $C_{02}$ are the only significant terms. That is, the dominant coupling is to the nearest neighbor, with much weaker coupling to the next nearest neighbor, etc.

- The combline antenna has the electrical behavior of a band pass filter.

- Considering only $C_{00}$ and $C_{01}$ (nearest neighbor coupling only) the lower cutoff $\beta_+$ and upper cutoff $\beta_-$ are given approximately by $\beta_\pm C_e \tan \beta_\pm \ell = C_{00} \pm 2 C_{01}$.

DISPERSION WITHOUT PLASMA-NUMERICAL EXAMPLES

- Referring to Figs. 2A, 3A & 3B both examples will have strap width w = 5 cm and thickness t = 2.5 cm, spacing s = 5.4 cm, and strap length 31.25 cm. For Case A, the backplane spacing $d_1 = 5$ cm, while for Case B, $d_1 = 2.5$ cm. The loading capacitance $C_\ell = 16$ pf, while in B, $C_\ell = 20$ pf.

- For both cases, the spacing of the front wall, which only exists for the zero order calculation, is chosen as $d_2 = 15$ cm. This is somewhat arbitrary, but $(u_o - u_r)$ in Fig. A5 should be large enough so that $\rho_{ref} \approx Re(\rho_p)$ in order that the perturbation approach be justified.

- Figure A3 shows the vacuum dispersion.

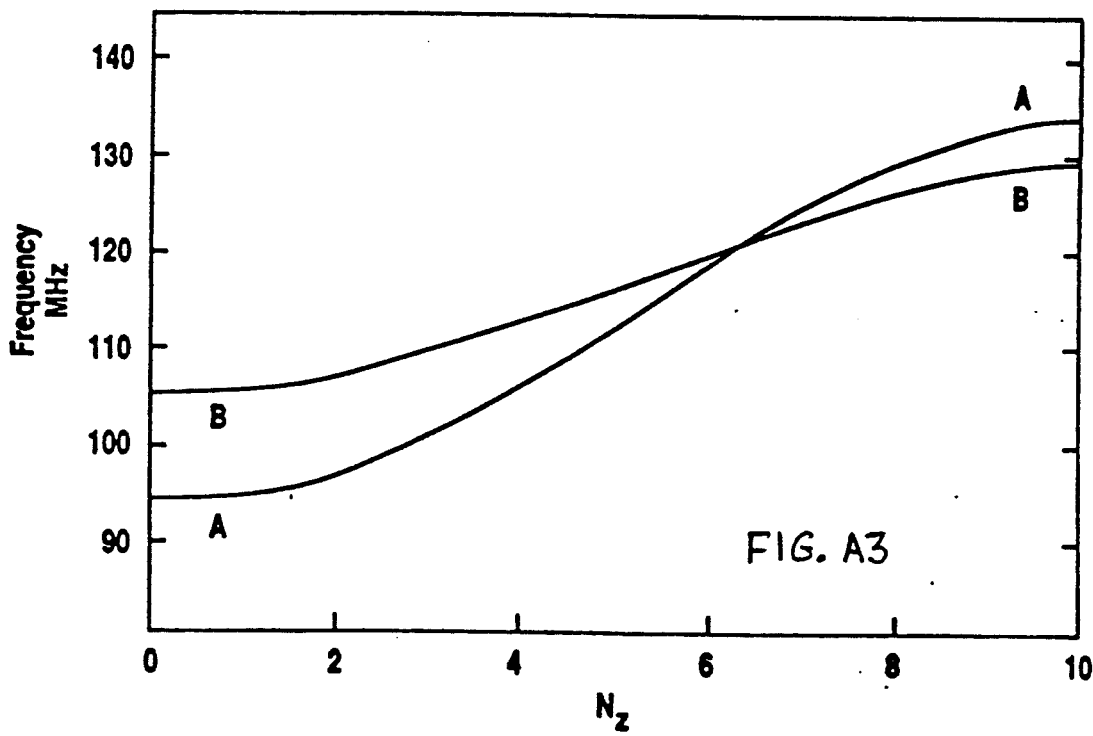

FIG. A3

• It can be seen that the reduced backplane spacing results in a narrower pass band, which is a consequence of reduced mutual coupling. Increasing the strap length $L_s$ has a similar effect, because the increased capacitive mutual coupling partially cancels the inductive mutual coupling which is greatest near the grounded end of the strap.

*Capacitances/met*

Case A

```
THETA=   0.00  FTCAPACITANCE/EPSO= 2.544591E+00
THETA=  27.69  FTCAPACITANCE/EPSO= 2.784339E+00
THETA=  55.38  FTCAPACITANCE/EPSO= 3.419069E+00
THETA=  83.08  FTCAPACITANCE/EPSO= 4.255287E+00
THETA= 110.77  FTCAPACITANCE/EPSO= 5.087064E+00
THETA= 138.46  FTCAPACITANCE/EPSO= 5.743573E+00
THETA= 166.15  FTCAPACITANCE/EPSO= 6.103560E+00
```
} $C(\theta)/\varepsilon_0$

```
CAP( 0)=  4.410029E+00
```
← *self capacitance*

```
CAP( 1)= -8.979000E-01
CAP( 2)= -3.093096E-02
CAP( 3)= -3.421417E-03
CAP( 4)= -4.103367E-04
CAP( 5)= -5.113161E-05
CAP( 6)= -7.216747E-06
```
} *mutual capacitances* $C_{0n}/\varepsilon_0$

Case B

```
THETA=   0.00  FTCAPACITANCE/EPSO= 4.139451E+00
THETA=  27.69  FTCAPACITANCE/EPSO= 4.335978E+00
THETA=  55.38  FTCAPACITANCE/EPSO= 4.852842E+00
THETA=  83.08  FTCAPACITANCE/EPSO= 5.526823E+00
THETA= 110.77  FTCAPACITANCE/EPSO= 6.190420E+00
THETA= 138.46  FTCAPACITANCE/EPSO= 6.710133E+00
THETA= 166.15  FTCAPACITANCE/EPSO= 6.993793E+00
```
} $C(\theta)/\varepsilon_0$

```
CAP( 0)= 5.643033E+00  ← self
CAP( 1)=-7.194417E-01 ⎫   capacitance
CAP( 2)=-2.866231E-02 ⎪
CAP( 3)=-3.244767E-03 ⎬  mutual        $C_{on}/\varepsilon_o$
CAP( 4)=-3.893192E-04 ⎪   capacitances
CAP( 5)=-4.827059E-05 ⎪
CAP( 6)=-7.161727E-06 ⎭
```

VACUUM OHMIC ATTENUATION ALONG COMBLINE

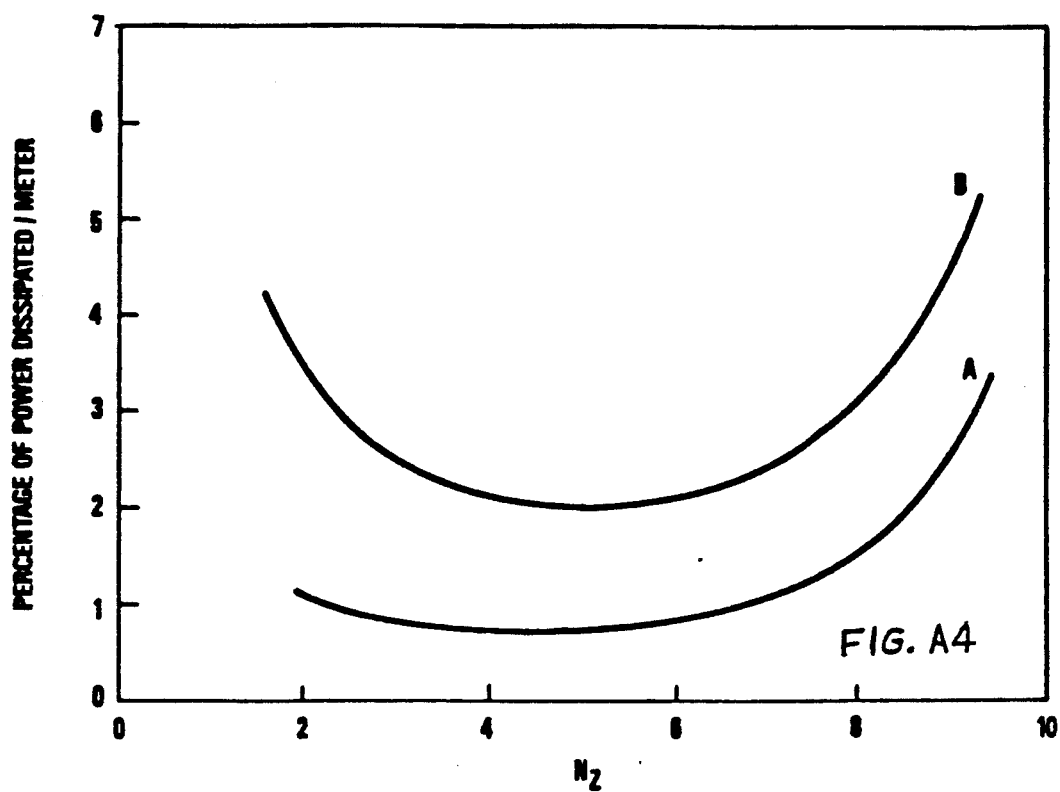

FIG. A4

PLASMA LOADING

- The radiation damping of the power traveling along the combline is given by the imaginary part of $n_z$ ($\rho_p$), where $\rho_p$ is the complex surface impedance presented by the plasma at a suitable reference plane $u_r \equiv x_r \omega/c$, $\omega$ the applied angular frequency and $c$ the velocity of light.

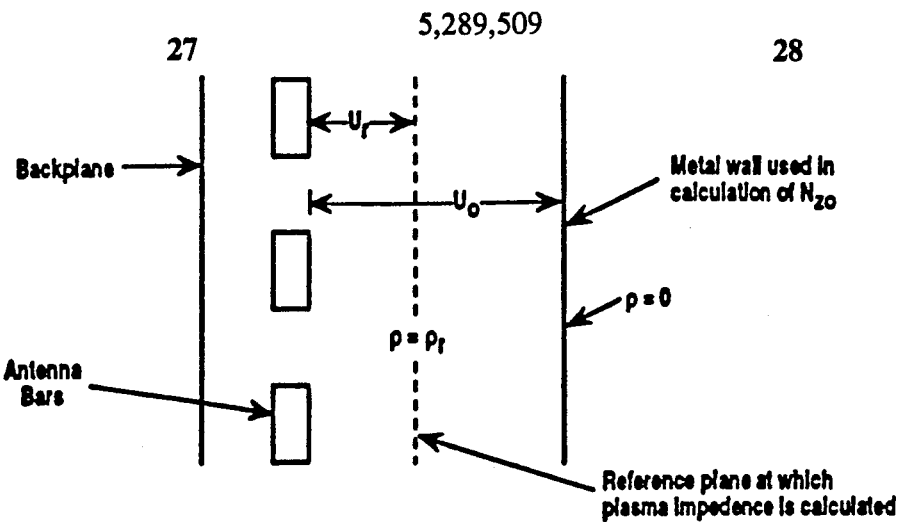

Fig. A5 Geometry of Loading Calculation

- $n_z(\rho_p)$ can be approximated by the first two terms of a Taylor series:

$$n_z(\rho_p) \approx n_{zo} + \left.\frac{dn_z}{d\rho}\right|_{\substack{\rho=\rho_r \\ u=u_r}} \cdot (\rho_p - \rho_r) \quad,$$

as suggested by Golant [1]. $\rho_r$, the impedance at $u_r$ with a metal wall at $u_o$, is real (purely reactive), while $\rho_p$ is complex. $n_{zo}$ only depends on $u_o$, aside from $\omega$ and structural parameters of the antenna.

- Since $\rho = 0$ at $u = u_o$, $$\rho = \rho_r = \frac{Z_o}{n_{zo}} \tanh[(u_o - u_r)\, n_{zo}]$$

at $u_r$, where $Z_o$ is the free space impedance.

- $$\frac{d\rho_{ref}}{du_o} = \frac{1}{\cosh^2[n_{zo}(u_o - u_r)]} + \left(\frac{u_o - u_r}{n_{zo}}\right)\frac{dn_{zo}}{du_o}$$
$$\times \left[\frac{1}{\cosh^2[n_{zo}(u_o - u_r)]} - \frac{\tanh[n_{zo}(u_o - u_r)]}{n_{zo}(u_o - u_r)}\right]$$

where $dn_{zo}/du_o$ is just the derivative of $n_{zo}$ with respect
to the position $u_o$ of the metal wall in the calculation
of the dispersion without plasma.

- Finally, $$n_z(\rho_p) \approx n_{zo} + \frac{\rho_p - \rho_r}{Z_o} \frac{dn_{zo}}{du_o}$$

$$\times \frac{\cosh^2[n_{zo}(u_o - u_r)]}{1 + \left(\frac{u_o - u_r}{n_{zo}}\right) \frac{dn_{zo}}{du_o} \left\{1 - \frac{\sinh[2 n_{zo}(u_o - u_r)]}{2 n_{zo}(u_o - u_r)}\right\}}$$

- The surface impedance of the plasma at $x_r^-$ (see Fig. A5)
  for the fast wave is calculated by numerically integrating
  the equation $(d^2 Ey/du^2) + n_\perp^2 Ey = 0$ from
  the interior density plateau outward. Here, $n_\perp^2$ is the
  fast wave root of the cold plasma dispersion relation Ref. [1],
  Eqs. (5-7), where coupling to the lower hybrid branch
  is neglected. The surface impedance is $\rho_p = -z_o Ey/(dEy/du)$
  at $u = u_r$ ($u \equiv k_o x$), at which point vacuum is
  assumed.

- If the density falls to zero for $x \leq x_{edge}$, any $x_r \leq x_{edge}$ could be used, but the perturbation approach is
  more justified when $Re(\rho_p) \approx \rho_r$, which is better
  satisfied when $x_r$ is well removed from the fast wave
  cutoff location in the plasma.

Ref. [1] V.E. Golant, Soviet Physics-Technical Physics, Vol. 16, (1972) p. 1980.

PLASMA LOADING — NUMERICAL EXAMPLE

- Two density profiles are used, shown schematically in Fig. 5A(L–mode) and Fig. 6A(H–mode). These idealizations of DIII–D profiles retain the features important to coupling, namely, the high edge density and gentle gradient of L–mode and the low edge density and steep gradient of H–mode. For $x \leq x_{edge}$, vacuum is assumed.

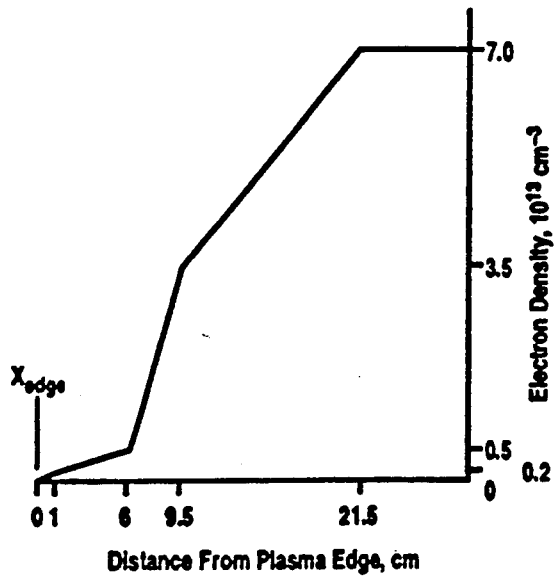

SCHEMATIC L-MODE DENSITY PROFILE, IN UNITS OF $cm^{-3}$

Fig. 5A

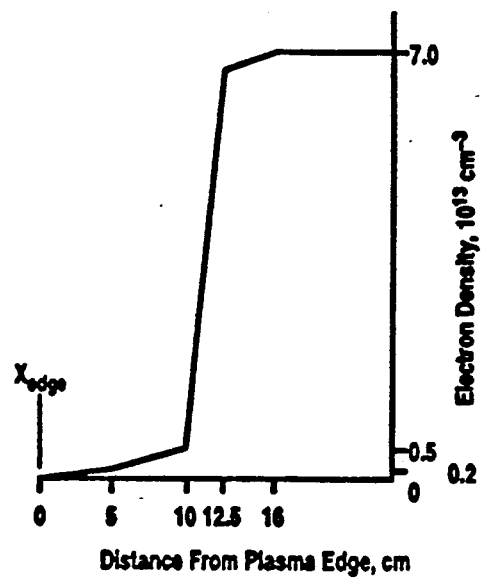

SCHEMATIC H-MODE DENSITY PROFILE, IN UNITS OF $cm^{-3}$

Fig. 6A

- The $1/e$ damping length (in power) for the two backplane spacings, Cases A and B, is shown in Fig. 7 as a function of vacuum $n_z$ from Fig.A3.

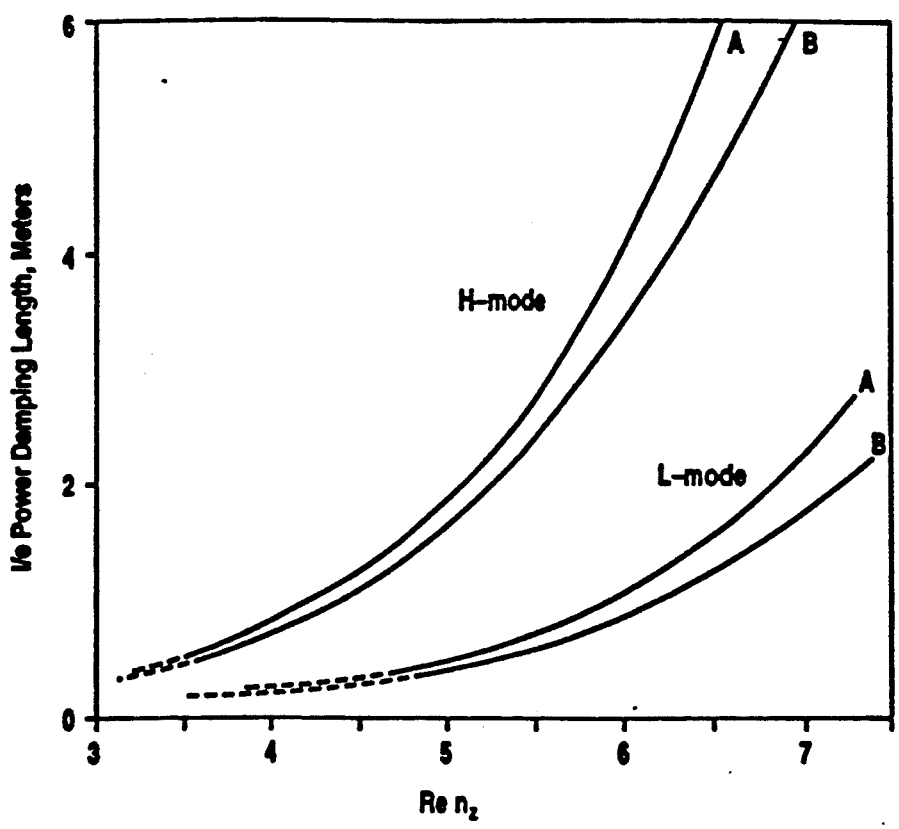

Fig. 7

- For these curves, $x_r$ (the point at which $dn_z/d\rho$ is evaluated) is chosen $= x_{edge}$. With the given $d_2 - x_r$ spacing, the condition $Re\ \rho_p \approx \rho_r$ (where $\rho_r$ is the antenna surface impedance at $x_r$ for $n_z = n_{z0}$) is satisfied along the solid parts of the curves, so that the correction to the $Re\ n_z$ is negligible($<2\%$). The lower parts of the L-mode curves are dashed to indicate $Im\ n_z$ and the correction to $Re\ n_z$ become so large in that region that this perturbation approach becomes questionable.

- The large difference in loading between the L-mode and H-mode cases is both a consequence of the steep gradient and the low edge density of the H-mode.

- In practice, the higher $n_z$ values would be suitable for an initial lower temperature L-mode discharge, while the lower $n_z$ range would be needed for the higher temperature, presumably H-mode, discharge, so that an extreme variation in loading could be avoided.

- For a purely L-mode discharge, acceptable coupling could be obtained with the antenna moved further away from the plasma, which is also advantageous.

What is claimed is:

1. A comb-line antenna comprising:

a plurality of parallel current straps supported in a plane above a conductive surface, each current strap having a specified length l and width W, each strap having a first end that is substantially aligned with the first ends of the other straps, each strap being separated a distance S from an adjacent strap, whereby an array of current straps is formed having approximate dimensions of l by N(W+S), where N is the number of current straps in the array;

input means for applying rf input power to a first current strap of said plurality of parallel current straps, said first current strap being located on one edge of said current strap array, a portion of said rf input power applied to said first current strap being inductively coupled to a second current strap adjacent the first current strap, and a portion of the rf input power coupled to the second current strap being inductively coupled to a third current strap adjacent the second current strap, and so on, with the rf input power being inductively coupled from one current strap to an adjacent current strap;

a multiplicity of U-shaped wickets connected to said conductive surface that enclose, but do not touch, each of said current straps, said multiplicity of U-shaped wickets functioning as a Faraday shield;

the current straps in said current strap array being configured to launch a portion of the input rf power away from said conductive surface and said current straps into a medium having a frontal surface that is more or less parallel to said current strap array, whereby said current strap array functions as an antenna that launches rf power into the medium.

2. The comb-line antenna as set forth in claim 1 wherein said medium comprises a plasma mass, and wherein said launched rf power assumes the form of a magnetosonic wave within said plasma mass.

3. The comb-line antenna as set forth in claim 2 wherein said current strap array is mounted within a conductive, open box having cross-sectional dimensions that are slightly larger than l by N(W+S), said box having an open top that faces the plasma mass, said conductive surface comprising a bottom surface of said box.

4. The comb-line antenna as set forth in claim 3 wherein said box is attached to a wall of a plasma-confining structure, said current strap array being exposed to the interior of said plasma-confining structure through the open top of said box, whereby rf power is launched into the interior of said plasma-confining structure from said comb-line antenna.

5. The comb-line antenna as set forth in claim 4 wherein said plasma-confining structure comprises a tokamak.

6. The comb-line antenna as set forth in claim 1 further including extraction means for extracting rf output power from a last current strap of said plurality of parallel current straps, said last current strap being positioned on an edge of said current strap array that is opposite said first current strap where rf input power is applied to said current strap array, whereby any of the rf input power that is applied to said first current strap and that is coupled through said current straps to said last current strap without being launched into said medium may be extracted from said current strap array.

7. The comb-line antenna as set forth in claim 6 further including means for recirculating the rf power extracted from said extraction means back to the input means.

8. The comb-line antenna as set forth in claim 6 wherein said rf input power has a frequency in the range of 100 to 200 MHz.

9. The comb-line antenna as set forth in claim 8 wherein the number N of current straps within said array is at least 10.

10. The comb-line antenna as set forth in claim 9 wherein the length l of said current straps comprises approximately 15 to 30 cm, the separation distance S between adjacent current straps comprises approximately 2.5 to 5.0 cm, and the width W of said current straps comprises approximately 2.5 to 5.0 cm.

11. The comb-line antenna as set forth in claim 9 wherein the current straps are positioned a standoff distance $d_1$ from said conductive surface, where $d_1$ comprises approximately 2.5 to 5.0 cm.

12. A comb-line antenna comprising a plurality of parallel current straps, each current strap being enclosed within a multiplicity of wickets, each of said wickets being grounded to a conductive ground plane, said conductive ground plane being a prescribed standoff distance from said plurality of parallel current straps, and input power means for applying rf input power to a first one of said plurality of parallel current straps, each of said current straps being spaced apart from an adjacent current strap a specified distance so that some of the rf input power applied to said power input means is inductively coupled from one current strap to an adjacent current strap, with each of said current straps receiving some rf power, where the rf power at each current strap produces an electromagnetic field.

13. The comb-line antenna as set forth in claim 12 further including output power means for extracting output power from a last one of said plurality of parallel current straps, whereby any rf power remaining at the last current strap may be extracted and recirculated back to the input power means.

14. The comb-line antenna as set forth in claim 13 further including support means for supporting said plurality of parallel current straps adjacent a plasma mass, with the electromagnetic wave launched from said plurality of current straps comprising a magnetosonic wave that propagates within said plasma, and with said multiplicity of wickets functioning as a Faraday shield that shields said plasma mass from electrostatic fields that are present in the vicinity of said current straps.

15. The comb-line antenna as set forth in claim 14 wherein said plasma mass is confined within a tokamak, and wherein said support means is mounted on the inside of an exterior wall of a vacuum vessel within said tokamak so that said plurality of parallel current straps fronts said plasma mass.

16. A method of launching magnetosonic waves into a plasma comprising:

(a) supporting a multiplicity of parallel current straps an equal distance apart, and positioning said equally-spaced, parallel current straps so as to front said plasma;

(b) applying rf input power to a first of said plurality of parallel current straps, said rf input power being inductively coupled from one current strap to an adjacent current strap, whereby a portion of the rf input power applied to said first current strap is inductively coupled to a second current strap adjacent said first current strap, and a portion of the rf power coupled to the second current strap is inductively coupled to a third current strap adjacent said second current strap, and so on, with the rf input power being inductively coupled from one current strap to an adjacent current strap so that each of said current straps receives some rf power, and with some of the rf power present at each current strap being launched from the respective current strap as a magnetosonic wave into said plasma; and (c) shielding said plasma from electrostatic fields present at said current straps.

17. The method as set forth in claim 16 wherein step (c) comprises enclosing each of said multiplicity of parallel current straps within a multiplicity of conductive wickets, each of said wickets having an appropriate shape that encloses, but does not touch, the respective current strap about which it is placed, each of said wickets further being grounded to a ground plane that is a prescribed stand-off distance from said parallel current straps.

18. The method as set forth in claim 17 further including extracting rf power from a last of said multiplicity of current strips and recirculating said extracted rf power back to said first current strip.

* * * * *